United States Patent
Benfold et al.

(10) Patent No.: US 12,434,140 B2
(45) Date of Patent: Oct. 7, 2025

(54) ESTIMATING POSE FOR A CLIENT DEVICE USING A POSE PRIOR MODEL

(71) Applicant: Niantic Spatial, Inc., San Francisco, CA (US)

(72) Inventors: Ben Benfold, Oxford (GB); Victor Adrian Prisacariu, Oxford (GB)

(73) Assignee: Niantic Spatial, Inc., San Francisco, CA (US)

( * ) Notice: Subject to any disclaimer, the term of this patent is extended or adjusted under 35 U.S.C. 154(b) by 334 days.

(21) Appl. No.: 18/301,665

(22) Filed: Apr. 17, 2023

(65) Prior Publication Data

US 2024/0342598 A1    Oct. 17, 2024

(51) Int. Cl.
*A63F 13/428* (2014.01)
*A63F 13/211* (2014.01)
*A63F 13/216* (2014.01)
*G06F 3/0346* (2013.01)

(52) U.S. Cl.
CPC .......... *A63F 13/428* (2014.09); *A63F 13/211* (2014.09); *A63F 13/216* (2014.09); *G06F 3/0346* (2013.01)

(58) Field of Classification Search
CPC .... A63F 13/428; A63F 13/211; A63F 13/216; A63F 13/25; A63F 13/50; A63F 13/52; A63F 13/525; A63F 13/53; A63F 13/5378; A63F 13/56; G06T 7/70

See application file for complete search history.

(56) References Cited

U.S. PATENT DOCUMENTS

| | | | |
|---|---|---|---|
| 11,417,069 B1* | 8/2022 | Gupta | G06V 20/70 |
| 11,461,923 B2 | 10/2022 | Aoki et al. | |
| 2015/0213590 A1 | 7/2015 | Brown et al. | |
| 2016/0055671 A1* | 2/2016 | Menozzi | H04N 23/63 |
| | | | 701/300 |
| 2018/0341811 A1 | 11/2018 | Bendale et al. | |
| 2020/0302634 A1 | 9/2020 | Pollefeys et al. | |
| 2021/0125372 A1* | 4/2021 | Fragoso Rojas | G06T 7/70 |
| 2021/0150228 A1* | 5/2021 | Goforth | G06V 10/242 |

OTHER PUBLICATIONS

U.S. Appl. No. 17/686,119, filed Mar. 3, 2022, Inventors Ben Benfold and Victor Adrian Prisacariu (copy not enclosed).

* cited by examiner

*Primary Examiner* — David L Lewis
*Assistant Examiner* — Shauna-Kay Hall
(74) *Attorney, Agent, or Firm* — Fenwick & West LLP (57) ABSTRACT

An online system uses a pose prior model and a pose objective function to estimate the pose of a client device. A pose prior model is a model for prior information known about client devices and their poses without reference to a particular client device and its pose data. The online system receives pose data from a client device and computes an estimated pose for the client device based on the received pose data, the pose prior model, and a generated initial candidate pose for the client device. The online system uses these as inputs to a pose objective function and optimizes the pose objective function to estimate a pose for the client device. The online system transmits this estimated pose to the client device, and may use the estimated pose as the pose for the client device for the purposes of delivering content to the user.

20 Claims, 5 Drawing Sheets

ESTIMATING POSE FOR A CLIENT DEVICE USING A POSE PRIOR MODEL

CROSS-REFERENCE TO OTHER APPLICATIONS

This application incorporates by reference U.S. patent application Ser. No. 17/686,119, filed Mar. 3, 2022.

BACKGROUND

An online system may track the location and orientation (collectively "pose") of a user device in the physical world to provide services to the user. For example, in augmented reality (AR) applications, an online system may overlay virtual elements on the depiction of the real-world environment. Specifically, the online system may display a virtual element over a video feed captured by the user device and displayed to the user such that the virtual element appears to be located within the physical world. The online system uses the device's pose to correctly display the virtual element. For example, the online system may use the device's orientation to determine whether to display the virtual element and if so, where in the video feed to display the virtual element.

An online system may receive pose data describing the pose of a user's client device and may estimate the pose of the client device based directly on the pose data. For example, the online system may receive GPS data describing a client device's location and VPS data describing the orientation of the client device, and may use those measurements as the pose for the client device. However, these measurements may have uncertainties and generally lack contextual information that would allow for resolution for those uncertainties. For example, a client device's GPS location may indicate that the device is on a sidewalk one meter away from a street, but the uncertainty in the device's location may be a two meter radius. For certain online systems, it is less likely that the device is located within the street and more likely that the user is located on the sidewalk (e.g., if the online system allows a user to play an AR game through the client device while the user is walking). Similarly, the device is more likely to be oriented parallel to the street rather than perpendicular to it, since users tend to travel along streets rather than across them. Thus, because online systems tend to lack the contextual information on poses of typical client devices, online systems tend to have a high uncertainty in the actual pose of a client device.

SUMMARY

An online system, such as a game server, uses a pose prior model and a pose objective function to estimate the pose of a client device. A pose prior model is a model for prior information known about client devices and their poses without reference to a particular client device and its pose data. For example, the pose prior model may store historical pose data from client devices and may store the poses of those client devices in probability distributions that are part of the pose prior model. In some embodiments, the pose prior model may include different prior models for different geographic or spatial regions.

The online system receives pose data from a client device and computes an estimated pose for the client device based on the received pose data, the pose prior model, and a generated initial candidate pose for the client device. The online system uses these as inputs to a pose objective function and optimizes the pose objective function to estimate a pose for the client device. The pose objective function is an objective function that quantifies how well a candidate pose complies with the pose prior model and received pose data. The online system may apply an optimization algorithm to the pose objective function to compute an estimated pose for the client device. The online system transmits this estimated pose to the client device. The online system additionally may use this estimated pose as the pose for the client device for the purposes of delivering content to the user.

By using a pose prior model, the online system can more effectively contextualize pose data received from a client device to better estimate what the actual pose of the client device is. Furthermore, by optimizing a pose objective function that takes pose data and the pose prior model, the online system balances the particular pose data for the client device with the contextual information from the pose prior model in computing the estimated pose for the client device.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining camera poses is desirable. For example, the method described herein may be implemented in a location-based application that displays virtual navigation instructions or text labels that relate to real-world information. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
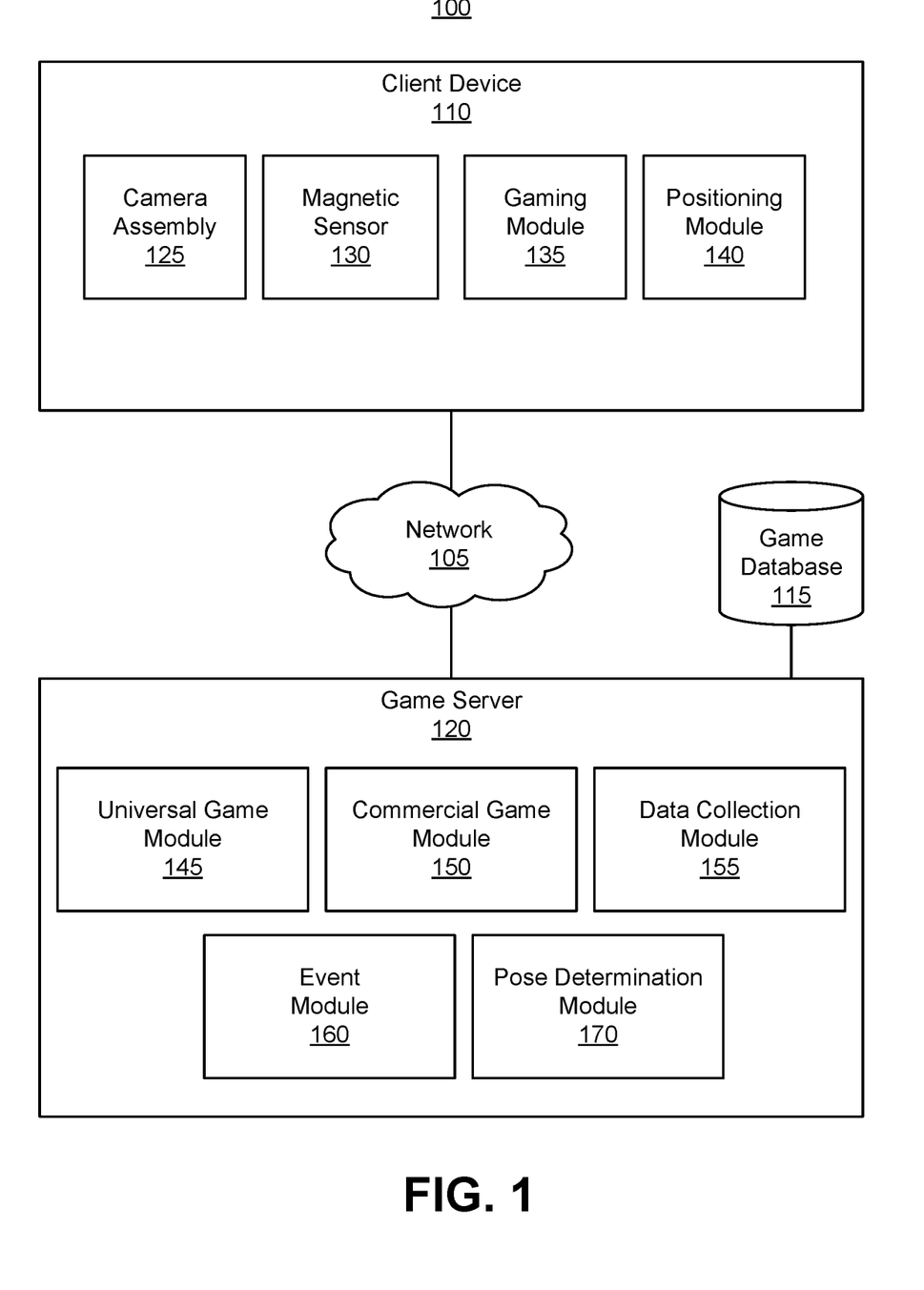
FIG. 1 illustrates a networked computing environment, in accordance with some embodiments.

FIG. 1 illustrates a networked computing environment 100, in accordance with one or more embodiments. Although FIG. 1 depicts a parallel reality gaming environment as an example, but the describe methods/systems may be used in other contexts. In practice, and as recognized by those of ordinary skill in the art, a networked computing environment may have additional, less, or variations of the components provided in FIG. 1. Additionally, functionality of each of the components may be divided up differently from the description below. For example, the client device may compute a device correction vector locally or by transmitting measurements to a remote server (e.g., game server 120) to compute the device correction vector.

The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

The networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of client devices 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, each client device 110 includes a magnetic sensor 130 and software components such as a gaming module 135 and a positioning module 140. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, depth sensors, etc. The captured images and the various sensory data may be used as visual inertial odometry (VIO) data. The client device 110 may send the VIO data to the pose determination module 170 to determine a pose of the client device 110, e.g., the orientation of the client device 110. The client device 110 can further include a network interface for providing communications over the network 105. A network interface can include any suitable components for interfacing with one more networks, including for example, transmitters, receivers, ports, controllers, antennas, or other suitable components.

The camera assembly 125 captures image data of a scene of the environment in which the client device 110 is located. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g., temperature, brightness of environment) or capture data (e.g., exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The magnetic sensor 130 is a sensor that captures magnetic field measurements. For example, the magnetic sensor 130 may include a compass, a magnetometer, or a magnetic field detector. The magnetic sensor 130 captures magnetic field measurements of the magnetic field generated by the Earth and the magnetic field generated by electronics within the client device 110 itself. In other words, measurements captured by the magnetic sensor may reflect the sum of the Earth's magnetic field and the client device's magnetic field.

The magnetic sensor may periodically capture magnetic field measurements or may capture magnetic field measurements when instructed to do so by a processor of the client device 110. The client device 110 may use the positioning module 140 to determine the location of the client device 110 when the magnetic sensor 130 captures magnetic field measurements.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g., renders imagery of the virtual world) associated with the game and allows a user to interact in the virtual world to perform various game objectives. In some embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to a depth map of the scene captured in the image data. In other embodiments, the gaming module 135 generates virtual objects for display on a semi-transparent display through which the user views the real world (e.g., an AR headset, AR glasses, etc.). Thus, the virtual objects may be overlaid on the user's view of the real world.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on depth information. In another example, the gaming module 135 may update a virtual element based on a pose of the camera assembly.

In one embodiment, determination of a coarse position of the client device 110 may be performed at the client device 110. The client device 110 includes a positioning module 140 comprising any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may also use the measured magnetic field data from the magnetic sensor 130 in determining the location of the client device 110 in the physical space. The positioning module 140 may further include various other sensors that may aid in accurately positioning the client device 110 location. While the positioning module 140 may be used to determine a course position of the client device 110, re-localization of the client device 110 (e.g., to determine the device's fine-grain location and orientation) is performed by the pose determination module 170 on the game server 120, as discussed below. For example, the coarse location (e.g., the GPS coordinates) identified by the positioning module 140 may be used to identify a three-dimensional (3D) model of the environment in which the client device 110 is located, and the pose determination module 170 localizes against the retrieved model using images captured by the camera assembly 125 and the magnetic field measured by the magnetic sensor 130 on the client device 110.

In embodiments in which a coarse position of the client device is determined client-side, the positioning module 140 tracks the position of the player as the player moves around with the client device 110 in the real world and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g., to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 110 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the environment 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g., player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the game server 120 includes a universal gaming module 145, a commercial game module 150, a data collection module 155, an event module 160, and a pose determination module 170. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. In addition, the functions may be distributed among the elements in a different manner than described. For instance, the game database 115 can be integrated into the game server 120.

The universal game module 145 hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g., depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface) to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The pose determination module 170 may use the VIO data from the client device 110 to estimate a pose of the client device 110. The VIO data may include images captured by the camera assembly 125 and other sensor data. In some embodiments, the pose determination module 170 uses a computer vision algorithm to estimate the pose of the one or more cameras of the camera assembly 125. The pose determination module 170 is trained to determine the relative pose of a camera from one or more images captured by that camera relative to one or more existing images of the physical environment around the client device 110. In one embodiment, the pose determination module 170 uses GPS coordinates (e.g., received from the positioning module 140 on the client device 110) to retrieve a 3D model of the environment in which the client device 110 is located. In various implementations, the 3D model may be a point cloud or mesh topology generated from previously captured images of the environment. The pose determination module 170 then compares the one or more images captured by the camera assembly 125 to the retrieved 3D model to generate the pose estimate of the client device 110.

The pose determination module 170 uses a pose prior model and a pose objective function to estimate the pose of a client device. A pose prior model is a model for prior information known about client devices and their poses without reference to a particular client device and its pose data. The pose determination module 170 receives pose data from a client device and computes an estimated pose for the client device based on the received pose data, the pose prior model, and a generated initial candidate pose for the client device. The pose determination module 170 uses these as inputs to a pose objective function and optimizes the pose objective function to estimate a pose for the client device. The pose determination module 170 transmits this estimated pose to the client device, and may use the estimated pose as the pose for the client device for the purposes of delivering content to the user. Further details on how the pose determination module 170 may estimate a pose of a client device is described in further detail below.

The network 105 can be any type of communications network, such as a local area network (e.g., intranet), wide area network (e.g., Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g., TCP/IP, HTTP, SMTP, FTP), encodings or formats (e.g., HTML, XML, JSON), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen in order to play the location-based game. As a result, a user interface can include a plurality of non-visual elements that allow a user to interact with the game. For instance, the game interface can provide audible notifications to the player when the player is approaching a virtual element or object in the game or when an important event happens in the parallel reality game. A player can control these audible notifications with an audio control. Different types of audible notifications can be provided to the user depending on the type of virtual element or event. The audible notification can increase or decrease in frequency or volume depending on a player's proximity to a virtual element or object. Other non-visual notifications and signals can be provided to the user, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Example Method for Estimating a Pose of a Client Device

Figure 2:
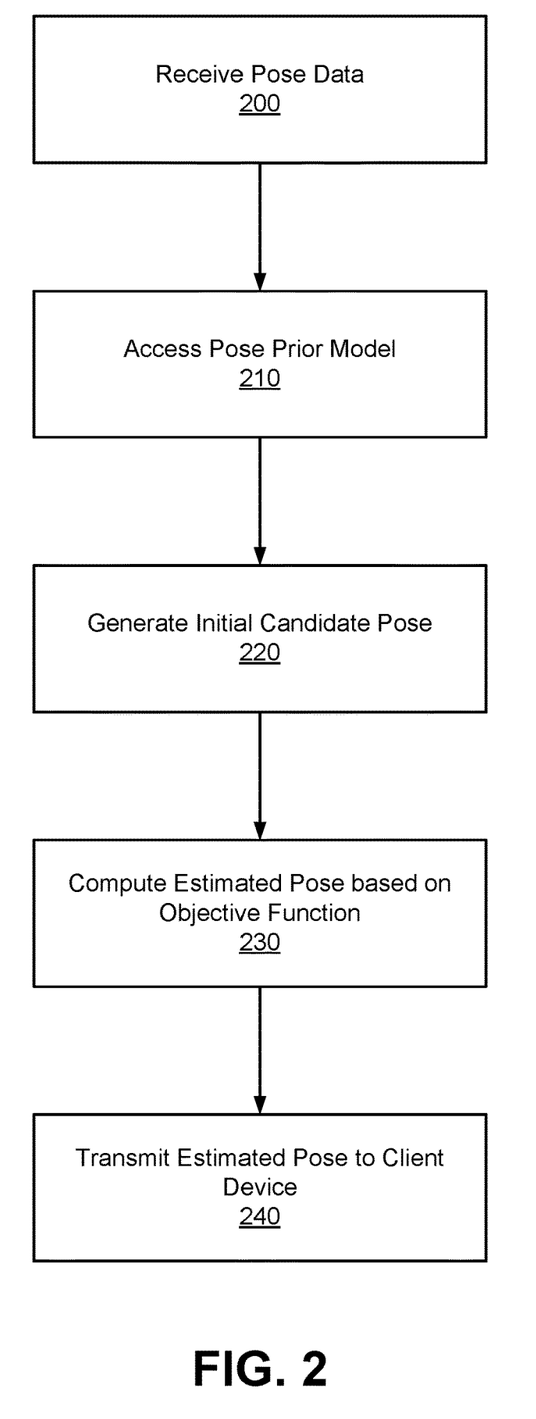
FIG. 2 is a flowchart for a method of estimating a pose of a client device, in accordance with some embodiments.

FIG. 2 is a flowchart for a method of estimating a pose of a client device, in accordance with some embodiments. Alternative embodiments may include more, fewer, or different steps from those illustrated in FIG. 2, and the steps may be performed in a different order from that illustrated in FIG. 2. Additionally, each of these steps may be performed automatically by the game server without human intervention.

The game server receives 200 pose data from a client device. Pose data is data describing the orientation and location of a client device. The pose data includes measurements from sensors of the client device, such as magnetometer measurements, IMU measurements, or GPS measurements. The pose data may also include image data captured by a camera of the client device or VPS data describing a predicted orientation or location of the client device. In some embodiments, the pose data includes data collected over a period of time. For example, the pose data may include position data captured within the last five seconds, which might indicate whether the client device is moving and, if so, the direction and magnitude of that movement.

The game server accesses 210 a pose prior model for the client device. The pose prior model is a model that represents probabilities that any client device has a given pose. The game server generates and maintains a pose prior model that uses data from a plurality of sources to estimate likelihoods that a client device is positioned at each of a plurality of real-world locations. The pose prior model represents the game server knowledge of the likelihood of a client device being located at each of the plurality of locations independent of the data received from the client device (e.g., before the game server receives or processes any frame or sensor data from the client device). The pose prior model is therefore a fixed representation, independent of the specific user for whom it is used to predict one or more likely locations. In various embodiments, the pose prior model further indicates probabilities regarding the orientation and velocity of the client device at each of the plurality of real-world locations.

The game server uses data from a variety of sources to construct the pose prior model and may update and refine the model as additional data is received (e.g., modifying the likelihoods that a user is located at each of the locations represented in the model). In one embodiment, a first data type comprises mapping scan data representing one or more of device location, orientation, and velocity from mapping scans captured by client devices (e.g., during a map generation process). A second data type that may be used to update and improve the accuracy of the pose prior model comprises real user locations, i.e., the position, orientation, and velocity of client devices. Still further, a third data type for constructing and updating the pose prior model comprises existing map data, such as the locations of roads, paths, buildings, and the like. Rules of expected user behavior may be applied to the existing map data to estimate the likelihood of users being in particular locations. For example, the rules may indicate that a user is more likely to travel parallel to a road than perpendicular to it and more likely to travel to the side of the road (e.g., on a sidewalk) than down the middle of the road.

In one embodiment, the existing map data may be used to produce general models for how map features behave, for example, the likelihood of user location given a specified distance from a road. These general models can then be applied to similar map structures to generate a pose prior model for a given geographic area. For example, the general structure-relative model parameters may be generated from specific locations where user location data exists:

$$M = \arg\max_m p(\{e_i\}|m, s)$$

where $e_i$ is the set of example locations and s is the map structure information around the sample locations. The pose prior model for a given location may be generated by applying the general structure-relative model to local map structures to calculate the probability that a user is at the pose x (e.g., p(x|M,s)). One of skill in the art will appreciate that additional or alternative data sources may be used to generate and update the pose prior model.

In some embodiments, a local pose prior model for a geographic region is generated based on poses of client devices that were located within the geographic region. For example, the game server may generate a local pose prior model for a geographic region by generating probabilistic distributions of the poses of client devices within the geographic region. When accessing a pose prior model to compute an estimated pose for a client device, the game server may identify a geographic region within which the client device is located and access the local pose prior model corresponding to the identified geographic region. Example pose prior models that may be used here are described in U.S. patent application Ser. No. 17/686,119, filed Mar. 3, 2022, which is incorporated by reference.

The game server generates 220 an initial candidate pose for the client device. The initial candidate pose is an initial prediction of the client device's pose. The game server may generate the initial candidate pose by randomly generating a pose near an estimated location for the client device. For example, the game server may receive location data for the client device as part of the pose data, which may indicate an estimated location of the client device. The game server may select a random initial candidate pose within some threshold area around the estimated location.

Alternatively, the game server may use an estimated pose generated by the client device as the initial candidate pose. For example, the client device may estimate its pose using a VPS, and may transmit that estimated pose to the game server to use as the initial candidate pose.

The game server computes 230 an estimated pose for the client device based on a pose objective function. The pose objective function is an objective function that quantifies how well a candidate pose complies with the pose prior model and the received pose data. For example, the pose objective function may represent a likelihood that the client device is in a particular pose based on the pose prior model and the received pose data. The pose objective function takes, as inputs, the received pose data, the pose prior model, and a candidate pose. When applied to these inputs, the pose objective function outputs a score representing how well the candidate pose fits the pose prior model and the received pose data. In some embodiments, the pose objective function is based on a maximum likelihood estimation.

The game server computes the estimated pose for the client device by optimizing the pose objective function. The game sever may optimize the pose objective function by applying an optimization algorithm to the pose objective function. For example, the game server may apply gradient descent, stochastic gradient descent, Newton's method, or Bayesian optimization to optimize the pose objective function. By optimizing the pose objective function, the game server may iteratively update the candidate pose that is input to the objective function from the initial candidate pose to a final estimated pose for the client device. For example, the game server may adjust the initial candidate pose to an intermediary candidate pose based on the output of the pose objective function and the optimization algorithm. The game server iteratively adjusts the intermediary candidate poses until the game server identifies a candidate pose that optimizes (e.g., minimizes or maximizes) the output of the pose objective function. In some embodiments, in addition to computing an estimated pose for the client device, the game server computes an uncertainty of the estimated pose based on the pose objective function. For example, the game server may estimate an uncertainty of the estimated pose based on a spatial distribution of observations in pose data and the individual error estimates thereof.

In some embodiments, the game server computes the estimated pose by computing a transformation from the device's reference frame to a global reference frame. For example, the game server may compute a transformation matrix that can be applied to a vector representing the device's pose in the device coordinate system to transform that vector to one in a world coordinate system. In some embodiments, that transformation T is computed as follows:

$$T = \arg\max_t p(O|t, M, s)$$

where O is a set of pose data observations, t is a candidate transform, M is a set of parameters for the pose prior model, and s is pose-specific structure information.

The game server transmits 240 the estimated pose to the client device. The client device may display the estimated pose of the client device to the user. The client device also may display content to the user based on the estimated pose. For example, the client device may display augmented reality content (e.g., as part of a game) to the user based on the estimated pose.

Figure 3A:
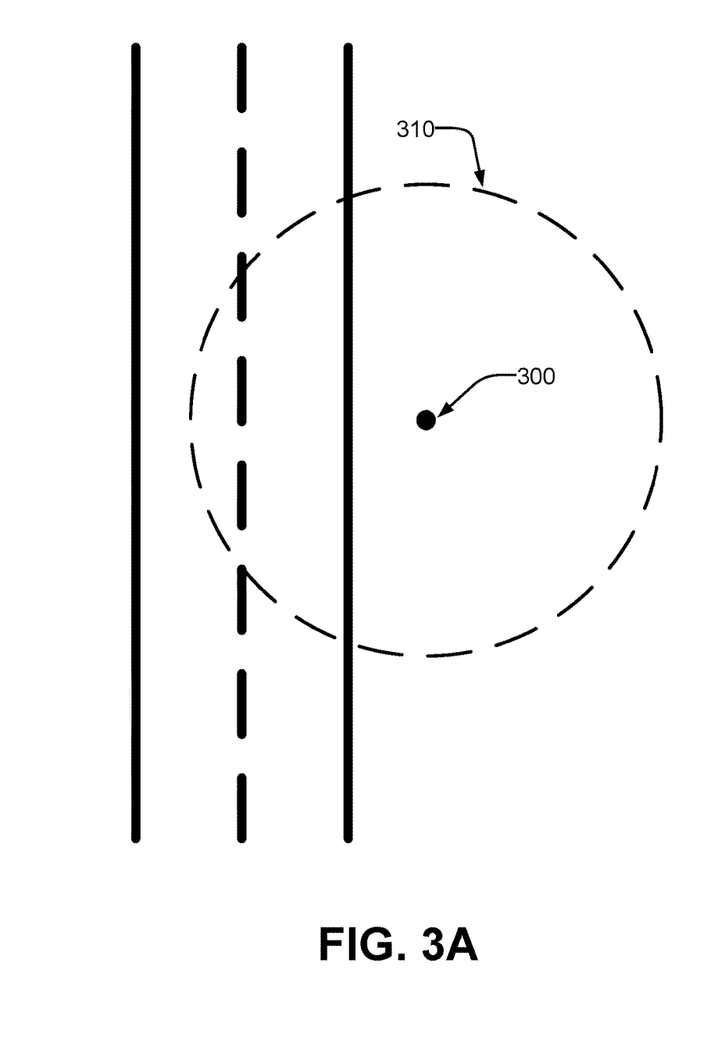
FIGS. 3A and 3B illustrates an example uncertainty in the pose data received from a client device, in accordance with some embodiments.
Figure 3B:
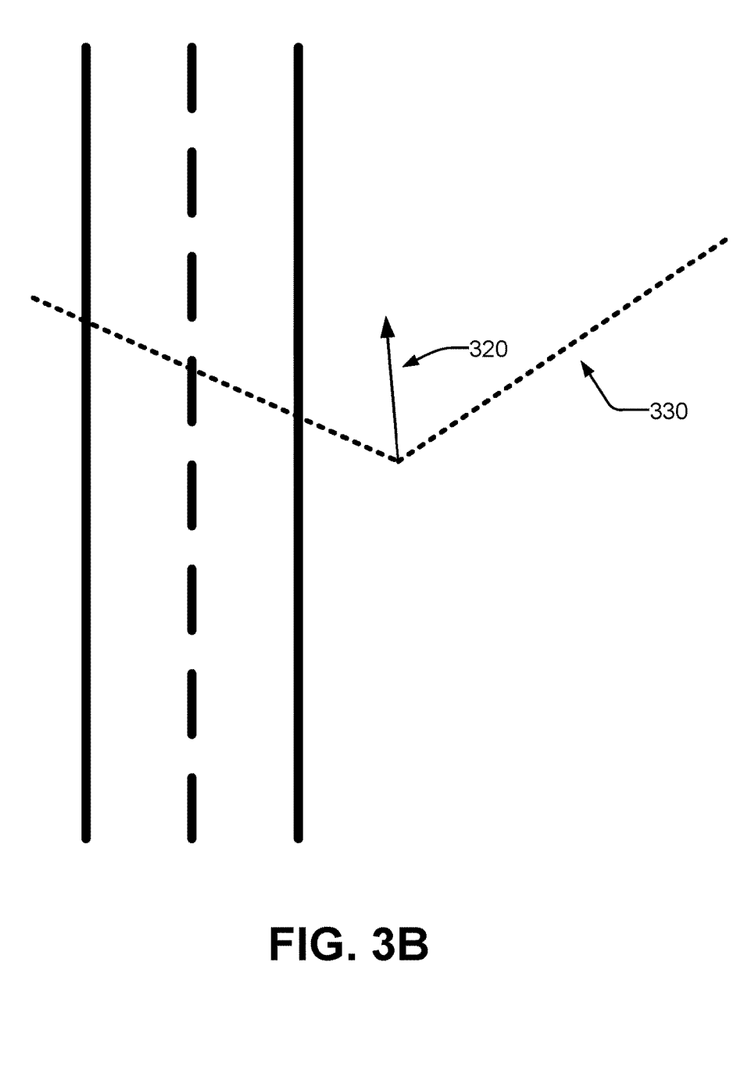

FIGS. 3A and 3B illustrates an example uncertainty in the pose data received from a client device, in accordance with some embodiments. In FIG. 3A, the pose data includes location data for a location of a client device. The pose data may indicate an initial predicted location 300 of the client device, but there may be an area of uncertainty 310 around the predicted location 300. The uncertainty may be included with the pose data or may be determined by the game sever. Similarly, in FIG. 3B, the pose data includes orientation data describing an orientation of the client device (e.g., from a VPS). The pose data may indicate an initial predicted orientation 320 for the device, but there may be an uncertainty 330 in the orientation. This uncertainty may be included with eh pose data or may be determined by the game server. Note that, while the pose data in FIG. 3A and FIG. 3B are described separately, pose data may include both location data and orientation data, each with their own uncertainty.

Figure 4:
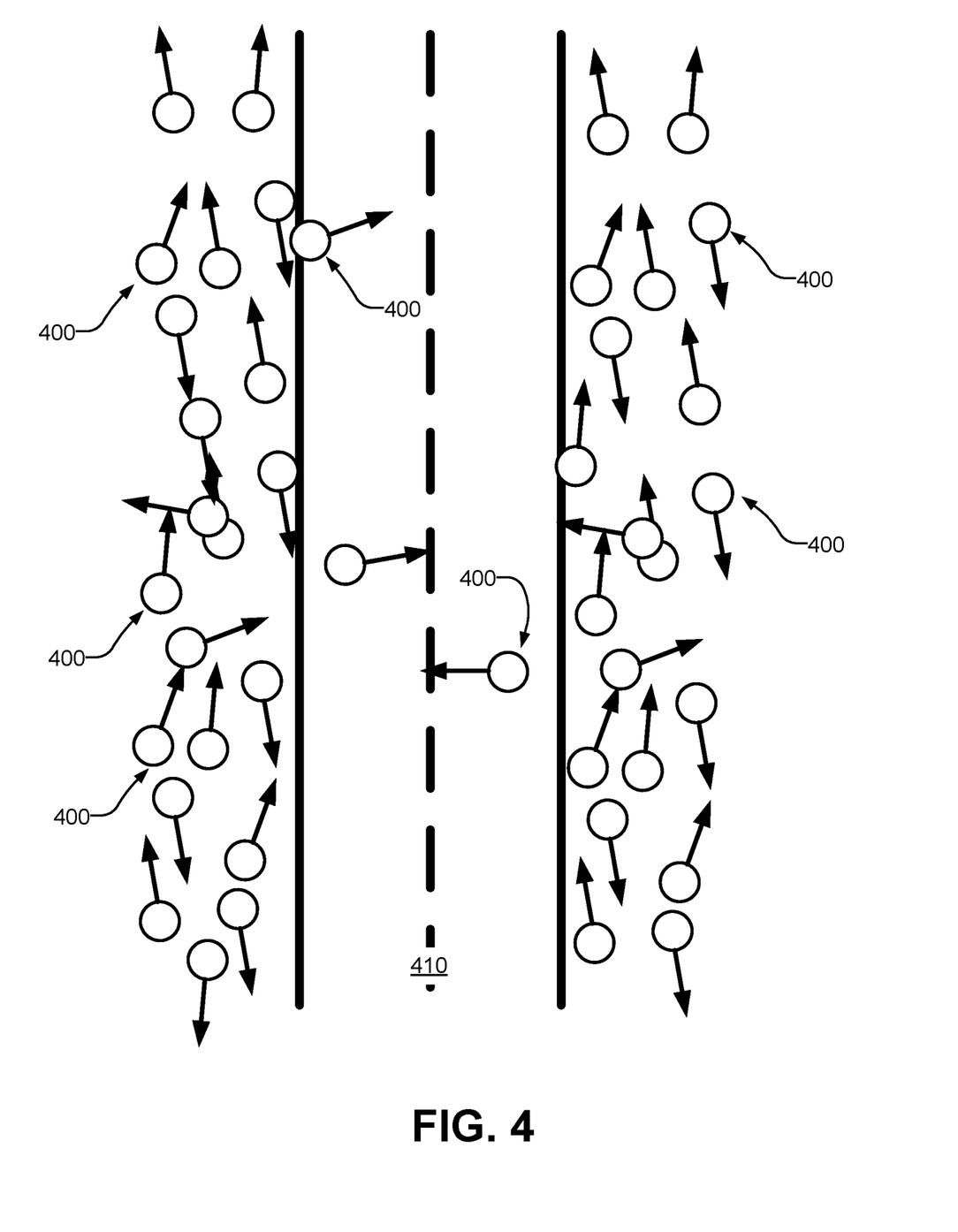
FIG. 4 illustrates example data points that could be used as part of a pose prior model, in accordance with some embodiments.

FIG. 4 illustrates example data points 400 that could be used as part of a pose prior model, in accordance with some embodiments. As illustrated in FIG. 4, the data points 400 are mostly located on the sides of the street 410, and have orientations that are generally parallel to the street 410. Thus, a pose prior model generated based on these data points may, when input to a pose objective function, cause the pose objective function to optimize for estimated poses that are located on the sides of the street and that have orientations that are generally parallel to the street 410.

Figure 5:
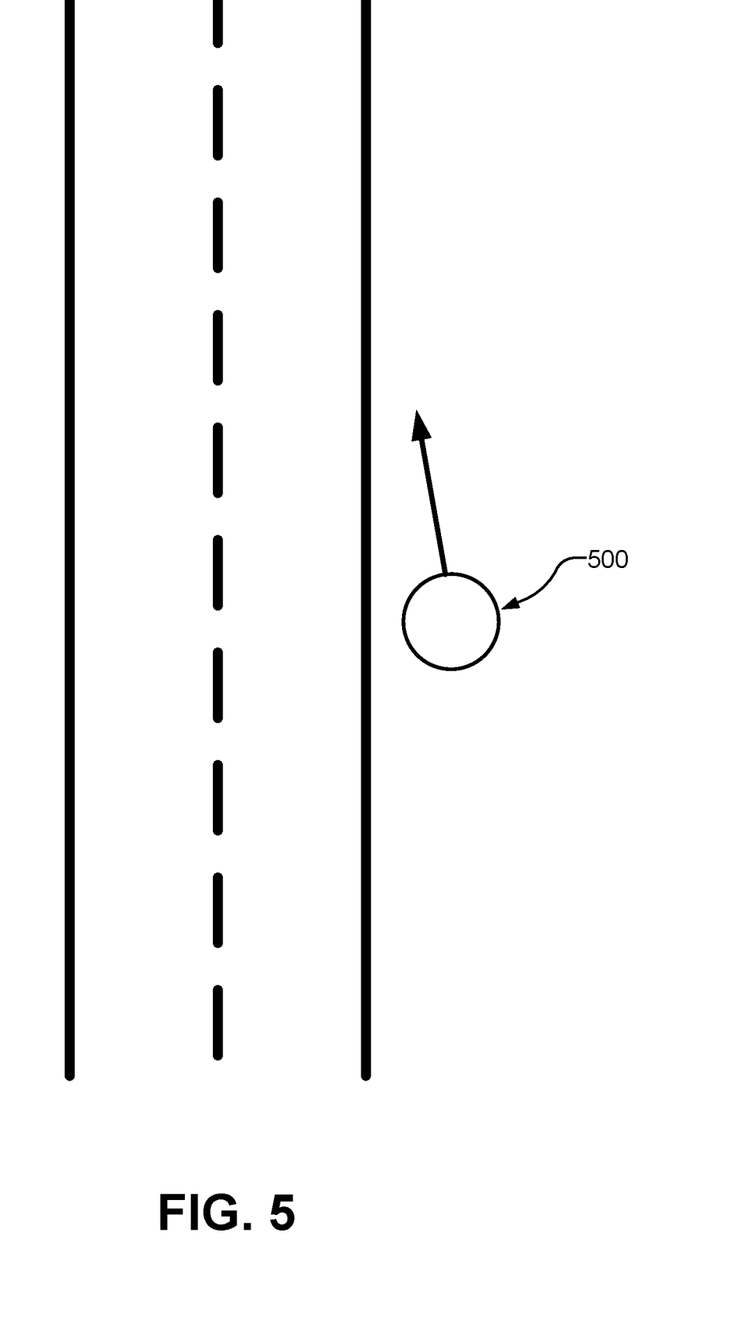
FIG. 5 illustrates an example estimated pose for a client device based on the pose data illustrated in FIGS. 3A and 3B and a pose prior model based on the data points illustrated in FIG. 4, in accordance with some embodiments.

FIG. 5 illustrates an example estimated pose for a client device based on the pose data illustrated in FIGS. 3A and 3B and a pose prior model based on the data points illustrated in FIG. 4, in accordance with some embodiments. As illustrated in FIG. 5, the estimated pose 500 is similar to the initial location prediction and the initial orientation prediction. However, the game server refined the estimated pose 500 based on the pose prior model where most data points are located on the sides of the street and oriented generally parallel to the street.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise. Where values are described as "approximate" or "substantially" (or their derivatives), such values should be construed as accurate +/−10% unless another meaning is apparent from the context. From example, "approximately ten" should be understood to mean "in a range from nine to eleven."

Upon reading this disclosure, those of skill in the art will appreciate still additional alternative structural and functional designs for a system and a process for determining a pose of client device. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed. The scope of protection should be limited only by the following claims.

What is claimed is:

1. A method comprising:
obtaining pose data describing a pose of a client device, wherein the pose data comprises a plurality of measurements captured by sensors of the client device;
accessing a pose prior model that represents probabilities that the client device has possible poses;
generating an initial candidate pose for the client device based on the received pose data;
computing an estimated pose for the client device based on a pose objective function, wherein the pose objective function takes, as inputs, pose data describing a pose of a client device, the pose prior model, and the initial candidate pose, wherein computing the estimated pose for the client device comprises optimizing the pose objective function based on the received pose data, the pose prior model, and the initial candidate pose for the client device; and
providing the estimated pose for use in displaying augmented reality content.

2. The method of claim 1, wherein the pose prior model is based on historical poses of other client devices but does not include pose data for the other client devices.

3. The method of claim 1, wherein the pose data comprises a measurement captured by a magnetometer, an inertial measurement unit, or a global positioning system sensor.

4. The method of claim 1, wherein the pose data comprises visual positioning data from a visual positioning system operating on the client device.

5. The method of claim 1, wherein accessing the pose prior model comprises:
identifying a geographic region within which the client device is located based on the pose data; and
accessing a local pose prior model corresponding to the geographic region.

6. The method of claim 5, further comprising:
generating the local pose prior model based on historical poses of a plurality of client devices located within the geographic region corresponding to the local pose prior model.

7. The method of claim 1, wherein generating the initial candidate pose comprises:
randomly generating an initial candidate pose based on the received pose data.

8. The method of claim 1, wherein generating the initial candidate pose comprises:
receiving an estimated pose from a visual positioning system of the client device.

9. The method of claim 1, wherein optimizing the pose objective function comprises:
applying an optimization algorithm to the pose objective function.

10. The method of claim 9, wherein applying the optimization algorithm comprises:
iteratively adjusting intermediary candidate poses based on the pose objective function to compute the estimated pose of the client device.

11. A non-transitory computer-readable medium storing instructions that, when executed by a processor, cause the processor to perform operations comprising:
obtaining pose data describing a pose of a client device, wherein the pose data comprises a plurality of measurements captured by sensors of the client device;
accessing a pose prior model that represents probabilities that the client device has possible poses;
generating an initial candidate pose for the client device based on the received pose data;
computing an estimated pose for the client device based on a pose objective function, wherein the pose objective function takes, as inputs, pose data describing a pose of a client device, the pose prior model, and the initial candidate pose, wherein computing the estimated pose for the client device comprises optimizing the pose objective function based on the received pose data, the pose prior model, and the initial candidate pose for the client device; and
providing the estimated pose for use in displaying augmented reality content.

12. The computer-readable medium of claim 11, wherein the pose prior model is based on historical poses of other client devices but does not include pose data for the other client devices.

13. The computer-readable medium of claim 11, wherein the pose data comprises a measurement captured by a magnetometer, an inertial measurement unit, or a global positioning system sensor.

14. The computer-readable medium of claim 11, wherein the pose data comprises visual positioning data from a visual positioning system operating on the client device.

15. The computer-readable medium of claim 11, wherein accessing the pose prior model comprises:
identifying a geographic region within which the client device is located based on the pose data; and
accessing a local pose prior model corresponding to the geographic region.

16. The computer-readable medium of claim 15, further storing instructions that, when executed by a processor, cause a processor to perform operations comprising:
generating the local pose prior model based on historical poses of a plurality of client devices located within the geographic region corresponding to the local pose prior model.

17. The computer-readable medium of claim 11, wherein generating the initial candidate pose comprises:
randomly generating an initial candidate pose based on the received pose data.

18. The computer-readable medium of claim 11, wherein generating the initial candidate pose comprises:
receiving an estimated pose from a visual positioning system of the client device.

19. The computer-readable medium of claim 11, wherein optimizing the pose objective function comprises:
applying an optimization algorithm to the pose objective function.

20. The computer-readable medium of claim 19, wherein applying the optimization algorithm comprises:
iteratively adjusting intermediary candidate poses based on the pose objective function to compute the estimated pose of the client device.

* * * * *